US012715458B2

(12) United States Patent
Heimberger et al.

(10) Patent No.: US 12,715,458 B2
(45) Date of Patent: Aug. 25, 2026

(54) METHOD AND DEVICE FOR ASCERTAINING A TYPE OF A COMPUTING DEVICE OF AN APPARATUS

(71) Applicant: Robert Bosch GmbH, Stuttgart (DE)

(72) Inventors: Thomas Heimberger, Hardthausen (DE); Fabian Wunderlich, Schwaebisch Hall (DE); Martin Marquart, Reichenbach (DE)

(73) Assignee: Robert Bosch GmbH, Stuttgart (DE)

( * ) Notice: Subject to any disclaimer, the term of this patent is extended or adjusted under 35 U.S.C. 154(b) by 115 days.

(21) Appl. No.: 18/251,600

(22) PCT Filed: Nov. 15, 2021

(86) PCT No.: PCT/EP2021/081652
§ 371 (c)(1),
(2) Date: May 3, 2023

(87) PCT Pub. No.: WO2022/106345
PCT Pub. Date: May 27, 2022

(65) Prior Publication Data
US 2024/0001946 A1 Jan. 4, 2024

(30) Foreign Application Priority Data
Nov. 19, 2020 (DE) ..................... 10 2020 214 599.7

(51) Int. Cl.
*B60W 50/04* (2006.01)
*B60T 8/88* (2006.01)
*B60T 17/22* (2006.01)

(52) U.S. Cl.
CPC ............. *B60W 50/04* (2013.01); *B60T 8/885* (2013.01); *B60T 17/22* (2013.01); *B60T 2270/406* (2013.01); *B60W 2050/043* (2013.01)

(58) Field of Classification Search
CPC ........... B60W 50/04; B60W 2050/043; B60W 2050/041; B60T 8/885; B60T 17/22; B60T 2270/406
See application file for complete search history.

(56) References Cited

U.S. PATENT DOCUMENTS 5,493,727 A * 2/1996 Ohya .................... G06F 9/4411 712/E9.007
5,521,588 A * 5/1996 Kuhner ................ G05B 19/042 340/12.28

(Continued)

FOREIGN PATENT DOCUMENTS

CN 103198000 A 7/2013
CN 104487856 A 4/2015

(Continued)

OTHER PUBLICATIONS

International Search Report for PCT/EP2021/081652, Issued Jan. 25, 2022.

*Primary Examiner* — Kurt Philip Liethen
(74) *Attorney, Agent, or Firm* — Norton Rose Fulbright US LLP

(57) ABSTRACT

A method for ascertaining a type of a computing device of an apparatus of a motor vehicle. The computing device is designed to at least partially control at least one function of the apparatus. Access to at least one register of a memory device of the apparatus takes place. A type of the computing device is ascertained based on a result of the access.

11 Claims, 2 Drawing Sheets

(56) References Cited

U.S. PATENT DOCUMENTS

| | | | | |
|---|---|---|---|---|
| 5,822,580 | A * | 10/1998 | Leung | G06F 9/465<br>707/999.103 |
| 7,039,511 | B1 * | 5/2006 | Kreuz | H04L 9/40<br>701/32.7 |
| 9,650,027 | B2 * | 5/2017 | Moessner | B60T 17/22 |
| 2007/0174502 | A1 | 7/2007 | Lin et al. | |
| 2008/0221752 | A1 | 9/2008 | Jager et al. | |
| 2015/0360666 | A1 * | 12/2015 | Gerdes | B60T 11/18<br>60/545 |
| 2016/0055052 | A1 | 2/2016 | Hu et al. | |
| 2016/0251009 | A1 * | 9/2016 | Willmann | B60T 13/743<br>60/533 |
| 2019/0102114 | A1 | 4/2019 | Sela et al. | |
| 2019/0210579 | A1 * | 7/2019 | Gerdes | B60T 13/166 |

FOREIGN PATENT DOCUMENTS

| | | | | |
|---|---|---|---|---|
| CN | 105144106 | A | 12/2015 | |
| CN | 107291457 | A | 10/2017 | |
| CN | 107750355 | A | 3/2018 | |
| CN | 107291457 | B | 7/2020 | |
| EP | 1967435 | A2 | 9/2008 | |
| EP | 2379377 | B1 | 10/2013 | |
| EP | 1967435 | B1 * | 3/2018 | B60W 50/045 |
| JP | 2000142363 | A | 5/2000 | |
| JP | 2009166779 | A | 7/2009 | |
| WO | 03086830 | A1 | 10/2003 | |
| WO | 2014033172 | A1 | 3/2014 | |

* cited by examiner

METHOD AND DEVICE FOR ASCERTAINING A TYPE OF A COMPUTING DEVICE OF AN APPARATUS

FIELD

The present invention relates to a method for ascertaining a type of a computing device of an apparatus of a motor vehicle and to a corresponding device. The apparatus, for instance, is an electromechanical apparatus for the motor vehicle and especially a control device such as an electromechanical brake booster.

BACKGROUND INFORMATION

Brake system typically include electromechanical brake boosters and driving dynamics control systems (electronic stability program, ESP). The brake booster is used to reduce the braking force to be generated by the driver and required to produce the required braking effect. The brake boosters generate the braking effect by generating a pressure differential with the aid of hydraulic or electric mechanisms. An exemplary brake booster is described in European Patent No. EP 23 79 377 B1, for example.

Brake boosters may include an application-specific integrated circuit (ASIC), which controls functions of the brake booster. Different ASICs may be used for different brake boosters. They can be distinguished by the function scope they provide. For example, an ASIC having a low function scope is unable to support any highly automated functions in the electromechanical brake booster, whereas some other type of ASIC is able to do so.

The provided information can be stored via the hardware configuration in the electromechanical brake booster.

In addition, the electromechanical brake booster may execute different functions based on the hardware configuration.

SUMMARY

The present invention provides a method and a device for ascertaining a type of a computing device of an apparatus of a motor vehicle.

Preferred embodiments of the present invention are disclosed herein.

According to a first aspect, the present invention relates to a method for ascertaining a type of a computing device of an apparatus of a motor vehicle. The computing device is designed to at least partially control at least one function of the apparatus. Access to at least one register of a memory device of the apparatus takes place. A type of the computing device is ascertained based on a result of the access.

According to a second aspect, the present invention relates to a device for ascertaining a type of a computing device of an apparatus. The computing device is designed to at least partially control at least one function of the apparatus. The device includes an interface which is able to access at least one register of a memory device of the apparatus. In addition, the device includes an ascertainment device, which ascertains the type of the apparatus based on a result of the access.

The present invention makes it possible to easily detect and check the different types or variants of computing devices of apparatuses of a motor vehicle.

Within the framework of the present invention, a 'type' of the computing device may relate to a hardware variant of the computing device, for instance.

By ascertaining the type of the computing device, a possible incorrect difference between a stored type of the computing device and the type of the actually installed computing device is able to be detected.

The ascertaining of the type of the computing device is advantageous in particular for mixed platforms, where multiple different hardware configurations are able to be controlled by the same application software. The ascertained type can be made available to the application software so that the application software is able to be correctly adjusted to the hardware configuration of the computing device.

In addition, it is possible that a software variant supports different types or hardware configurations of the computing device. This can minimize costs in the software development, the release, and the testing. These are in turn especially advantageous in particular for mixed platforms having different computing devices.

Reasons for the use of different types of computing devices may be cost savings as a result of changed function requirements or the development cycles in the hardware development. Changed function requirements, for instance, may relate to the provision or non-provision of highly automated driving, HAD.

Because of the defined access to registers of a memory device of the apparatus, an early identification of the actual type of the computing device can already be realized in an initialization phase.

According to a preferred refinement of the method according to the present invention for ascertaining the type of the computing device, the apparatus is a control device in the motor vehicle. Especially preferably, the control device is an electromechanical brake booster.

According to a preferred refinement of the method according to the present invention for ascertaining the type of the computing device, the computing device is an application-specific integrated circuit (ASIC). Based on the detected ASIC hardware, the ASIC is initialized accordingly. In addition, functions are able to be activated and deactivated via the detected ASIC functions. For example, functions for autonomous driving can be adapted in the electromechanical brake booster in a timely manner, which prevents a faulty control of the brake system.

According to a preferred refinement of the method of the present invention for ascertaining the type of the computing device, the memory device is a component of the computing device itself. For instance, the memory device may be part of the ASIC.

According to a preferred refinement of the method of the present invention for ascertaining the type of the computing device, the access to the at least one register includes a read access to read out an apparatus identification of the apparatus, and the ascertaining of the type of the computing device is carried out using the apparatus identification.

According to a preferred refinement of the method of the present invention for ascertaining the type of the computing device, the access to the at least one register includes a read access to at least one predefined register, and the ascertainment of the type of the computing device takes place based on the presence or absence of a transmission error. The result of the access may thus be compared to expected results in order to ascertain the type of the computing device.

According to a preferred refinement of the method of the present invention of for ascertaining the type of the computing device, each type of computing device includes a specific register, and an individual type is allocated to the computing device if no transmission error exists for the specific register assigned to the type. For example, it may be possible to produce at least two different types of computing devices, a first type of computing device having a first register, for example, which, or whose address, does not exist for the further types of computing devices, however. Computing devices of a second and possibly a further type thus have a second and possibly a further register, which does not exist for the respective other computing devices. If an attempt is then made to read out information from one of these dedicated or specific registers, a transmission error will occur if the register does not exist. If no transmission error has occurred, then it can be inferred that the type of the computing device is the type of computing device allocated to the register. Based on the response to the read access, the type of the computing device is able to be ascertained accordingly.

According to a preferred refinement of the method of the present invention for ascertaining the type of the computing device, the access to the at least one register is a read access.

According to a preferred refinement of the method of the present invention for ascertaining the type of the computing device, it is possible to confirm or verify, based on the ascertained type of the computing device, that a type of the computing device already stored in advance is actually present. For example, it can thereby be prevented that a computing device of the wrong type (or an apparatus with a computing device of the wrong type) is installed when repair work is carried out.

According to a preferred refinement of the method of the present invention for ascertaining the type of computing device, the ascertained type of the computing device is stored in a memory device of the apparatus. In particular, the type of the computing device may also be stored in a memory device of the computing device itself.

According to a preferred refinement of the method of the present invention for ascertaining the type of the computing device, software functions of the computing device are adapted and/or modified using the ascertained type of the computing device. The software functions may be a valve control of an electromechanical brake booster, for example. The software functions may also include the support or the behavior in connection with autonomous driving.

According to a preferred refinement of the method of the present invention for ascertaining the type of the computing device, the ascertaining of the type of the computing device is carried out during the first operation of the apparatus, and the apparatus is initialized based on the ascertained type of the computing device of the apparatus.

According to a preferred refinement of the method of the present invention for ascertaining the type of computing device, the ascertaining of the type of the computing device is undertaken during the system startup of the computing device. In particular, the method can be carried out every time the computing device or the apparatus of the motor vehicle is restarted.

According to a preferred refinement of the method of the present invention for ascertaining the type of the computing device, the method is executed during the series operation.

According to a preferred refinement of the method of the present invention for ascertaining the type of the computing device, a defined replacement reaction will be carried out if a modified hardware configuration is detected in the series operation. A warning message, for instance, may be output to the driver of the vehicle or to a service facility. For example, if an apparatus with a computing device of the wrong type was installed, this can be detected and an installation error be reported. The apparatus may then be replaced with an apparatus including a computing device of the correct type. Possible attacks by third parties are detectable as well.

Figure 1:
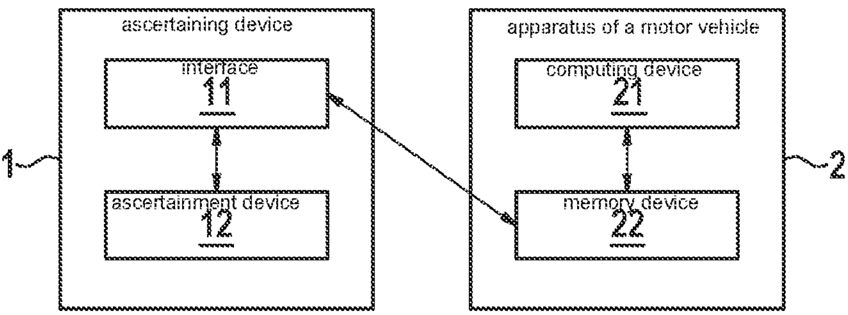
FIG. 1 shows a schematic block circuit diagram of a computing device of an apparatus of a motor vehicle and of a device for ascertaining a type of the computing device according to an example embodiment of the present invention.

In all of the figures, identical or functionally equivalent elements and devices have been provided with the same reference numerals. The numbering of method steps is provided for reasons of clarity and in general should not imply a specific time sequence. In particular, multiple method steps may also be executed simultaneously.

DETAILED DESCRIPTION OF EXAMPLE EMBODIMENTS

FIG. 1 shows a schematic block circuit diagram of a device 1 for ascertaining a type of a computing device 21 of an apparatus 2 of a motor vehicle. In the following text, the present invention will be described in greater detail for an electromechanical brake booster as apparatus 2 of the motor vehicle. However, the present invention is not restricted to such a device and may be used for different, in particular electromechanical, components of the motor vehicle.

Computing device 21 controls functions of the electromechanical brake booster such as the buildup of a brake pressure or the control of functions for autonomous driving. Computing device 21 may be, or may include, an application-specific integrated circuit, ASIC.

Device 1 can be an electronic control unit, ECU, of the motor vehicle. Device 1 may also be a special device which is coupled with electromechanical brake booster 2 after the assembly of electromechanical brake booster 2 in order to control the correct installation.

Device 1 includes an interface 11 for access to a memory device 22 of electromechanical brake booster 2. Memory device 22 may be separated from computing device 21 but can also be part of computing device 21.

Memory device 22 includes a multitude of registers, which differ for different types of apparatuses 2. In this context, 'registers' may be understood as memory areas in memory device 22 to which computing device 21 has access. In particular, the access is preferably independent of the data bus or address bus and may consequently take place very rapidly. The present invention is not restricted to a specific number or size of the registers.

Computing device 21 is able to access the registers of memory device 22 via an address decoder. Certain registers that do not exist for the other types of computing device 21 may exist for a predefined type of computing device 21. An actuation of the register via the corresponding address leads to a transmission error.

In addition, device 1 includes an ascertainment device 12, which ascertains the type of computing device 21 on the basis of a result of the access. For instance, if a certain register that exists only for a certain type of computing device 21 can be actuated, then ascertainment device 12 may ascertain that the type of computing device 21 is precisely this type of computing device 21.

To ascertain the type of computing device 21, a specific register can be actuated one after the other until no further transmission error occurs and the type of computing device 21 is therefore able to be determined. The sequence of the registers to be actuated may be fixedly predefined in this case.

In addition or as an alternative, ascertainment device 12 can determine the type of computing device 21 also be reading out a further register which includes an apparatus identification.

The access to memory device 22 by way of interface 11 is able to take place directly. However, it may also be provided that the access to memory device 22 occurs indirectly via interface 11. For example, according to one embodiment, interface 11 can be connected to an interface of computing device 22 and actuate computing device 22 via the interface and access a corresponding register in memory device 22. As a result, a direct access of device 1 to memory device 22 is not required.

After the ascertainment, information about the type of the computing device is able to be stored in memory device 22 and/or in a memory device of device 1 (not shown).

In addition, it may be provided that ascertainment device 12 actuates computing device 21 in such a way that functions of computing device 21 are adapted and/or modified based on the ascertained type of computing device 21. In this way, computing device 21 may be configured for autonomous driving, provided the type of computing device 21 permits it.

The ascertaining of the type of computing device 21 of apparatus 2 may be carried out during the first startup of apparatus 2. It may also be provided to ascertain the type of computing device 21 upon each startup of the motor vehicle.

Figure 2:
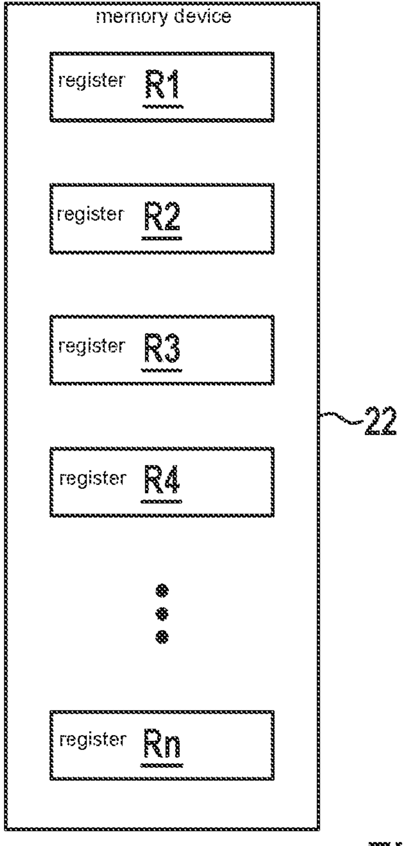
FIG. 2 shows a schematic representation of a memory device with registers of an apparatus of a motor vehicle.

FIG. 2 shows a schematic representation of memory device 22 with registers R1 to Rn of apparatus 2 of the motor vehicle.

A first register R1 may store information about an apparatus identification of apparatus 2 or computing device 21. Registers R2 to Rn may be provided in addition. However, a second register R2, for example, may be provided only for the specific type of computing device 21 while this register is unable to be actuated in computing devices 21 of another type, so that a transmission error or access error occurs.

Figure 3:
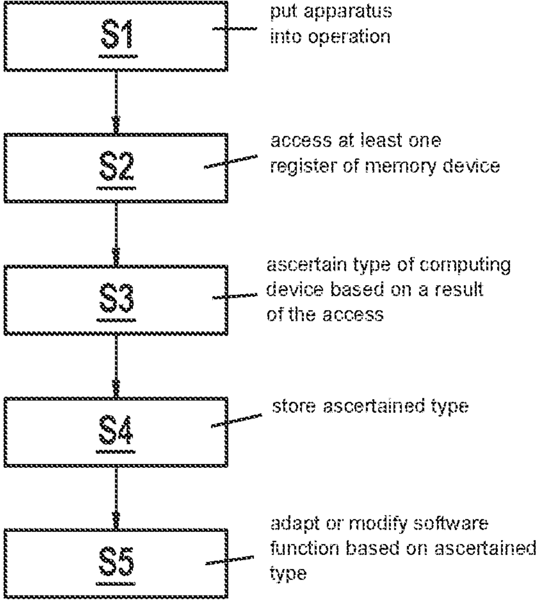
FIG. 3 shows a flow diagram of a method for ascertaining a type of a computing device of an apparatus of a motor vehicle according to an example embodiment of the present invention.

FIG. 3 shows a flow diagram of a method for ascertaining a type of a computing device of an apparatus of a motor vehicle, and in particular an afore-described apparatus 2.

In a first method step S1, apparatus 2 is taken into operation for the first time.

In a second method step S2, an ascertainment device 12 accesses at least one register R1 to Rn of a memory device 22 of apparatus 2 via an interface 11. The access may be a read access, for instance to read out an apparatus identification of apparatus 2 from one of registers R1 to Rn in memory device 22. In addition or as an alternative, the access may be a read access to at least one register R1 to Rn. Each type of computing device 21 may include a specific register which is not provided for other computing devices 21 or to which no access is able to take place.

In a third method step S3, the type of computing device 21 is ascertained based on a result of the access. For example, the type of computing device 21 is able to be ascertained based on the read-out apparatus identification. In addition or as an alternative, the type of computing device 21 may be ascertained based on the presence or absence of a transmission error during the read access to the at least one register R1 to Rn.

In a method step S4, the ascertained type of computing device 21 is optionally stored in memory device 22 of the apparatus.

In a method step S5, which is also optionally, at least one software function of computing device 21 is able to be adapted and/or modified based on the ascertained type of computing device 21.

What is claimed is:

1. A method for ascertaining a type of a computing device of an apparatus of a motor vehicle, the computing device being configured to at least partially control at least one function of the apparatus, the method comprising the following steps:

accessing at least one register of a plurality of registers of a memory device of the apparatus; and ascertaining the type of the computing device based on a result of the access, wherein the access to the at least one register includes a read access to at least one predefined register, and the ascertaining of the type of the computing device is carried out using a presence or an absence of a transmission error, wherein:

each type of computing device is associated with only one specific corresponding register of the plurality of registers that does not exist for every other remaining type of computing device such that for a first type of computing device only the specific corresponding one of the plurality of registers that exists for the first type of computing device is capable of producing the read access with the absence of the transmission error, and any register of the plurality of registers that does not exist for the first type of computing device is capable of only producing the read access with the presence of the transmission error, and a specific type is assigned to the computing device when no transmission error is present for the specific register assigned to the specific type.

2. The method as recited in claim 1, wherein the apparatus is an electromechanical brake booster.

3. The method as recited in claim 1, wherein the computing device is an application-specific integrated circuit (ASIC).

4. The method as recited in claim 1, wherein the access to the at least one register includes a read access to read out an apparatus identification of the apparatus, and the ascertaining of the type of the computing device is carried out using the apparatus identification.

5. The method as recited in claim 1, wherein the ascertained type of the computing device is stored in a memory device of the apparatus.

6. The method as recited in claim 1, wherein the ascertaining of the type of the computing device of the apparatus is carried out during a first operation of the apparatus, and the apparatus is initialized based on the ascertained type of the computing device.

7. The method as recited in claim 1, wherein:

the absence of the transmission error for the read access to the at least one predefined register indicates that the at least one register exists in the motor vehicle and that the computing device belongs to the type, and the presence of the transmission error for the read access to the at least one predefined register indicates that the at least one register does not exist in the motor vehicle and that the computing device belongs to a different type.

8. The method as recited in claim 1, wherein software functions of the computing device are adapted and/or modified using the ascertained type of the computing device.

9. A device configured to ascertain a type of a computing device of an apparatus, the computing device being configured to at least partially control at least one function of the apparatus, the device comprising:

an interface configured to access at least one register of a memory device of the apparatus; and an ascertainment device configured to ascertain the type of the computing device based on a result of the access, wherein the access to the at least one register includes a read access to at least one predefined register, and the ascertainment device ascertains the type of the computing device by using a presence or an absence of a transmission error, wherein:

each type of computing device is associated with only one specific corresponding register of the plurality of registers that does not exist for every other remaining type of computing device such that for a first type of computing device only the specific corresponding one of the plurality of registers that exists for the first type of computing device is capable of producing the read access with the absence of the transmission error, and any register of the plurality of registers that does not exist for the first type of computing device is capable of only producing the read access with the presence of the transmission error, and a specific type is assigned to the computing device when no transmission error is present for the specific register assigned to the specific type.

10. The device as recited in claim 9, wherein:

the absence of the transmission error for the read access to the at least one predefined register indicates that the at least one register exists in the motor vehicle and that the computing device belongs to the type, and the presence of the transmission error for the read access to the at least one predefined register indicates that the at least one register does not exist in the motor vehicle and that the computing device belongs to a different type.

11. The device as recited in claim 9, wherein software functions of the computing device are adapted and/or modified using the ascertained type of the computing device.

* * * * *